US007891238B2

(12) United States Patent
Becke et al.

(10) Patent No.: US 7,891,238 B2
(45) Date of Patent: Feb. 22, 2011

(54) THERMAL ANEMOMETER FLOW SENSOR APPARATUS WITH A SEAL WITH CONDUCTIVE INTERCONNECT

(75) Inventors: Craig Scott Becke, South Vienna, OH (US); Lamar Floyd Ricks, Lewis Center, OH (US); Jamie W. Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/388,670

(22) Filed: Feb. 19, 2009

(65) Prior Publication Data

US 2010/0154532 A1    Jun. 24, 2010

Related U.S. Application Data

(60) Provisional application No. 61/140,309, filed on Dec. 23, 2008.

(51) Int. Cl.
    *A63B 53/00*    (2006.01)
(52) U.S. Cl. .................................................. 73/170.12
(58) Field of Classification Search ................... 73/204, 73/204.21, 204.22, 204.11, 204.15, 204.18
    See application file for complete search history.

(56) References Cited

U.S. PATENT DOCUMENTS

| 3,604,261 | A |   | 9/1971  | Olin ............................ 73/189 |
| 4,537,068 | A |   | 8/1985  | Wrobel et al. ................ 73/202 |
| 4,744,246 | A | * | 5/1988  | Busta ....................... 73/204.26 |
| 4,794,794 | A |   | 1/1989  | Djorup ........................ 73/204 |
| 5,069,066 | A | * | 12/1991 | Djorup ..................... 73/204.15 |
| 5,218,865 | A |   | 6/1993  | Djorup ........................ 73/189 |
| 5,357,795 | A |   | 10/1994 | Djorup .................... 73/170.12 |
| 5,410,916 | A |   | 5/1995  | Cook |
| 5,639,964 | A |   | 6/1997  | Djorup .................... 73/170.12 |
| 6,117,292 | A |   | 9/2000  | Ahmad |
| 6,134,958 | A |   | 10/2000 | Djorup .................... 73/170.12 |
| 6,591,674 | B2 | * | 7/2003 | Gehman et al. .......... 73/204.22 |
| 6,799,456 | B2 |   | 10/2004 | Ito et al. |
| 6,826,966 | B1 |   | 12/2004 | Karbassi et al. |
| 6,905,242 | B2 |   | 6/2005  | Heuer et al. ................. 374/142 |
| 6,971,274 | B2 |   | 12/2005 | Olin ......................... 73/866.5 |

(Continued)

FOREIGN PATENT DOCUMENTS

DE    102004021304    11/2005

(Continued)

OTHER PUBLICATIONS

26PC High Pressure Sensors, Honeywell, Sep. 2000.
26PC SMT Series Pressure Sensor, Sensing and Control, Honeywell, 2003.

*Primary Examiner*—Jewel Thompson
(74) *Attorney, Agent, or Firm*—Honeywell International Inc.

(57) ABSTRACT

A flow sensor apparatus and method. A seal with a conductive interconnect is provided that includes a mass flow sense element mounted to a housing containing a thick film and/or thin film bridge structure for sensing media (e.g., mass flow) within a flow tube. The seal effectively isolates wirebond pads and electrical connections from the sensed media. The media, whether liquid or gas, can contain ionics that eventually contaminate the top of the mass flow sense element. The use of the seal with the conductive interconnect thus seals off the electrical connections and prevents exposure to the sensed media.

19 Claims, 5 Drawing Sheets

U.S. PATENT DOCUMENTS

| | | |
|---|---|---|
| 7,162,927 B1 | 1/2007 | Selvan et al. |
| 7,197,953 B2 | 4/2007 | Olin .......................... 73/866.5 |
| 7,380,471 B2 | 6/2008 | Geller ..................... 73/861.85 |
| 7,430,918 B2 | 10/2008 | Selvan et al. |
| 2007/0147024 A1 | 6/2007 | Wu |
| 2007/0251328 A1 | 11/2007 | Selvan et al. |
| 2008/0066541 A1 | 3/2008 | Burton ..................... 73/204.15 |

FOREIGN PATENT DOCUMENTS

| | | |
|---|---|---|
| EP | 1691175 | 8/2006 |
| WO | 0212835 | 2/2002 |
| WO | 2005029008 | 3/2005 |

* cited by examiner

THERMAL ANEMOMETER FLOW SENSOR APPARATUS WITH A SEAL WITH CONDUCTIVE INTERCONNECT

CROSS-REFERENCE TO PROVISIONAL APPLICATION

This application claims priority to U.S. Provisional Patent Application Ser. No. 61/140,309, entitled "Thermal Anemometer Flow Sensor Apparatus with a Conductive Seal," which was filed on Dec. 23, 2008, and is incorporated herein by reference.

TECHNICAL FIELD

Embodiments are generally related to flow sensors. Embodiments are also related to thermal anemometers. Embodiments are additionally related to thermal anemometer flow sensor devices.

BACKGROUND OF THE INVENTION

It is desirable in applications such as, for example, fuel control for automotive engines, to accurately measure the mass flow rate of a stream of air. Mass flow measurement is a critical component in a majority of residential, commercial, and industrial applications. Proper flow measurement can ensure balance, energy efficiency, and cost effectiveness. A thermal anemometer can be utilized to measure mass flow and temperature of the sensed media.

The majority of prior art thermal anemometers include the use of a mass flow sense element mounted to a ceramic substrate and containing a thick film and/or thin film bridge structure with discrete signal conditioning circuitry. The discrete signal conditioning circuitry can be utilized to convert sensed flow into a proportional analog output signal. The mass flow sense element and the signal conditioning circuitry can be connected utilizing wire bonds and wires on a printed circuit board (PCB) or ceramic substrate. Typically, such wire bonds and wires possess a further tendency to interact with the sensed media and form ionic contamination that can lead to false electrical signals or eventual failure. Additionally, wirebonds can increase undesirable turbulence and shift flow response. The wire is also susceptible to damage in a high mass flux environment, such as liquid flow, due to its thinness and upon attempts to clean the sensor. Unfortunately, such thermal anemometers are susceptible to damage caused by repeated or long term exposure of wire bonds and wires to external environments such as, for example, moisture, chemicals etc.

Based on the foregoing, it is believed that a need exists for an improved thermal anemometer flow sensor apparatus with a seal with a conductive interconnect for electrically connecting the sense die bridge (thin film or thick film) to the signal conditioning circuitry and providing a seal to isolate the bridge physically from external environment, as described in greater detail herein. The design of such a structure can enable mass flow sensing over wide ranges at a reasonable cost and provide trouble free operation in heretofore-hostile environments.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved mass flow sensor apparatus and method of forming the same.

It is another aspect of the present invention to provide for an improved thermal anemometer flow sensor apparatus with a seal with a conductive interconnect, including a method thereof.

The aforementioned aspects and other objectives and advantages can now be achieved as described herein. A thermal anemometer flow sensor apparatus with a seal with a conductive interconnect is disclosed, including a method thereof, which includes a mass flow sense element mounted to a housing containing a thick film and/or thin film bridge structure for sensing mass flow within a flow tube. The seal with a conductive interconnect can be utilized to electrically connect the sense bridge to a signal conditioning circuitry in order to provide a seal to isolate the bridge physically from moisture, chemicals, etc. The flow sense bridge output can be transferred to the signal conditioning circuitry to convert the sensed mass flow into a proportional analog output signal. Such a flow sensor apparatus eliminates the need for wirebonds from the flow sensing bridge to the signal conditioning circuitry, which reduces overall footprint of the sensor.

The seal with a conductive interconnect can be utilized as part of the flow channel for sensing mass flow. The mass flow sense element can further be electrically bonded with the seal with a conductive interconnect in order to electrically connect several external electrical terminals or lead frames to the mass flow sense element. The bridge structure provides a sensitive and fast response to the flow of air or other gas over the flow sense element. The seal with a conductive interconnect can be utilized to mount the flow sense element upside down for preventing moisture ingress and dust particle build up in the thermal anemometer flow sensor apparatus. The seal with a conductive interconnect isolates conductive pads associated with the flow sense element from moisture exposure thereby preventing moisture related corrosion on the conductive pads.

A cover in association with the flow tube comprising an inlet and an outlet port can be added to one side of the flow sense element. The flow sense bridge elements are typically connected in a Wheatstone bridge circuit to convert the sensed mass flow into a corresponding voltage. The seal with a conductive interconnect can apply power to the flow sense bridge from the signal conditioning circuitry and transfer the output of the flow sense bridge to the signal conditioning circuitry. The flow tube can be utilized to route non-turbulent flow across the flow sense element of the thermal anemometer. Such a flow sensor apparatus is smaller, lower in cost, more robust, and easier to assemble utilizing a seal with a conductive interconnect thereby eliminating the need for bonding wires.

The disclosed embodiments provide a number of advantages, including the benefit that is gained from the seal with a conductive interconnect, which isolates the wirebond pads and electrical connections form the sensed media. The media, whether liquid or gas, can contain ionics that eventually contaminates the top of the mass flow sense element. This situation will not occur if the seal with a conductive interconnect has sealed off these electrical connections and prevent exposure with the sensed media.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
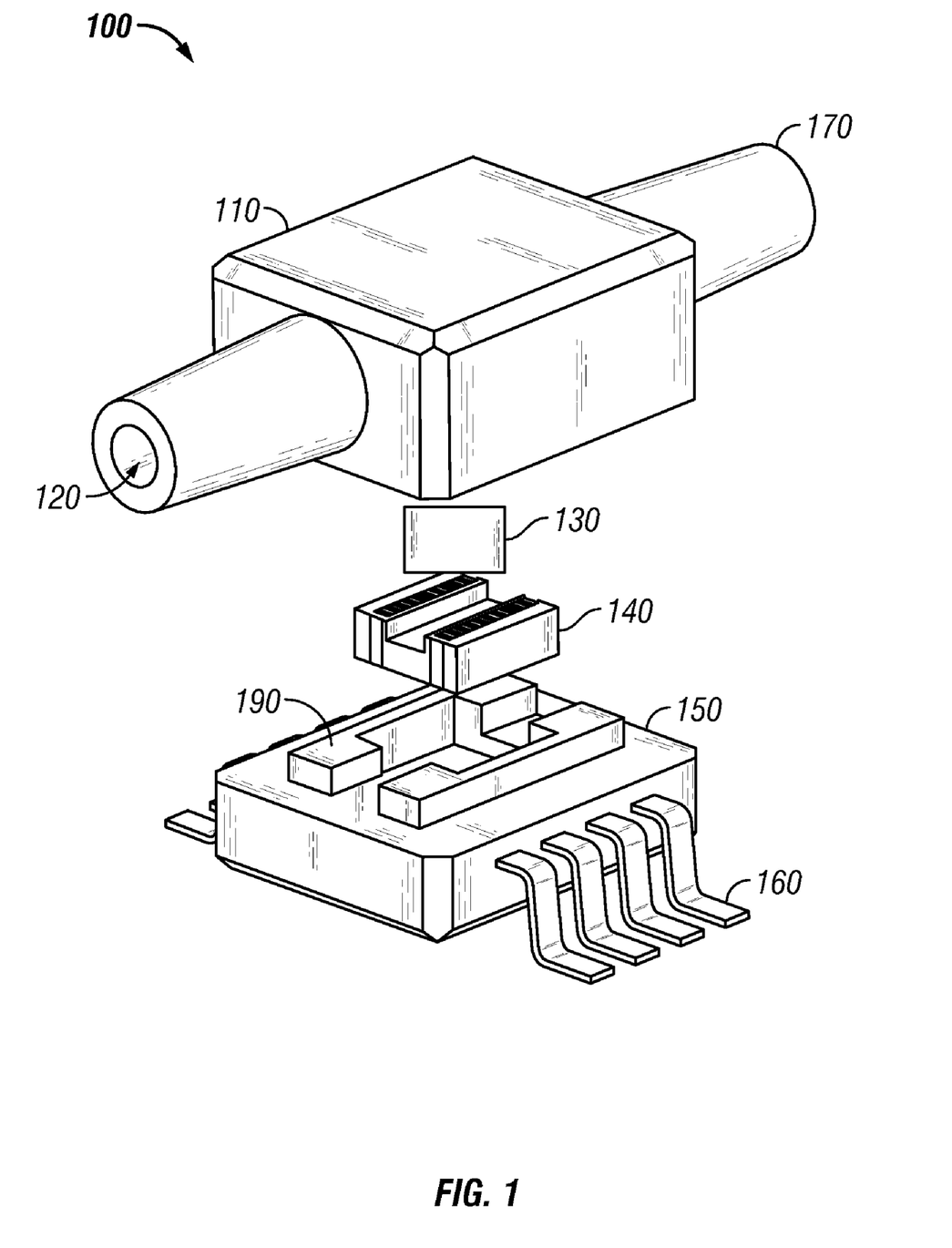
FIG. 1 illustrates an exploded view of a thermal anemometer flow sensor apparatus, in which embodiments of the present invention may be implemented.

FIG. 1 illustrates a perspective view of a thermal anemometer flow sensor apparatus 100, in which embodiments of the present invention may be implemented. Note that the thermal anemometer flow sensor apparatus 100 can assume a wide variety of forms appropriate for a particular residential, commercial, or industrial application. The flow sensor apparatus 100 can be designed utilizing a semiconductor technology. The apparatus 100 generally includes a housing 150 and a flow tube 170 associated with a flow cover 110. The thermal anemometer flow sensor apparatus 100 further includes a mass flow sense element 130 that can be integrated with an application specific integrated circuit (ASIC) 190. The mass flow sense element 130 can be configured to include a thin film and/or a thick film bridge structure (i.e., thick film not shown) for sensing mass flow within the flow tube 170. An example of a thin film is, for example, a silicon-based MEMS structure or microbridge for a mass flow sense element. An example of a thick film is hybrid-based configuration.

The mass flow sense element 130 can further be electrically bonded with a seal 140 with a conductive interconnect in order to electrically connect several external electrical terminals or lead frames 160 to the air flow sense element 130. The air flow sense element 130 and the seal 140 can be incorporated into the metal or plastic housing 150, into which the electrical terminals or lead frames 160 can be molded. The seal 140 may act as part of the flow tube 170 for sensing the flow of the sensed media Note that as utilized herein, the term "media" refers generally to a fluid, air, gas, etc. that flows through the flow tube 170.

Figure 2:
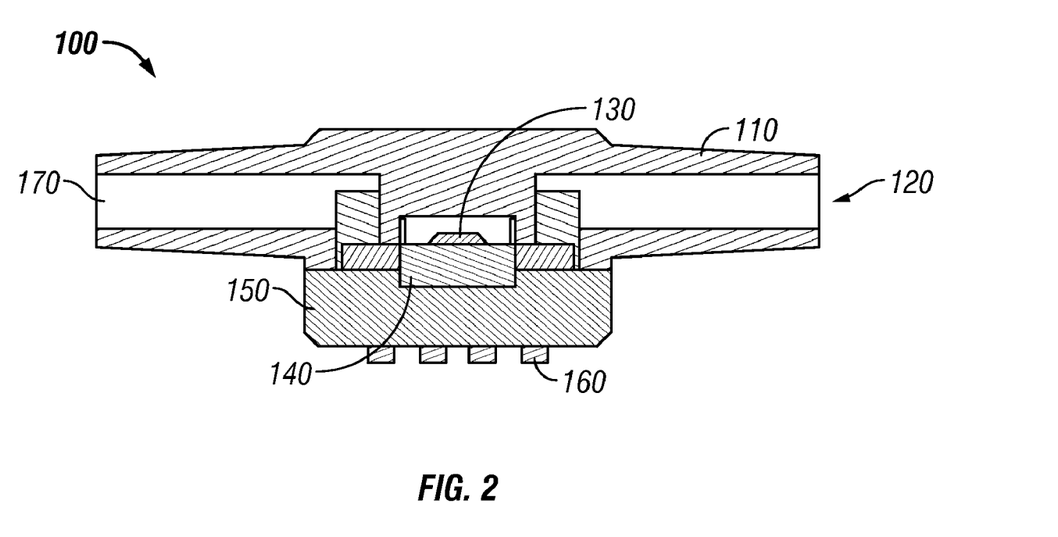
FIG. 2 illustrates a side sectional view of the thermal anemometer flow sensor apparatus depicted in FIG. 1, in accordance with a preferred embodiment.

FIG. 2 illustrates a side sectional view of the thermal anemometer flow sensor apparatus 100, in accordance with a preferred embodiment. Note that in FIGS. 1-7, identical, similar parts or elements are generally indicated by identical reference numerals. The seal 140 electrically connects the flow sense element 130 to the leadframe terminals. In accordance with an alternative embodiment, the housing may alternatively contain an ASIC chip 190 and the output signals of the flow sense element can be connected to the inputs of the ASIC. For example, the ASIC chip referenced herein may contain large functions, such as a microprocessor, memory block or communications block, which can be tied together via small amounts of glue logic. The ASIC chip 190 incorporated in the sensor apparatus 100 brings about signal amplification.

The entire thermal anemometer flow sensor apparatus 100 can be heat-sealed, or joined by any other plastic joining process. Note that housing 150 may be formed from a material such as plastic. Additionally, the flow tube 170 permits the sensor apparatus 100 to come into contact with the mass flow through a flow path 120. The flow tube 170 is compatible for use with existing flow systems and as such is shaped in a circular cross-sectional shape.

Figure 3:
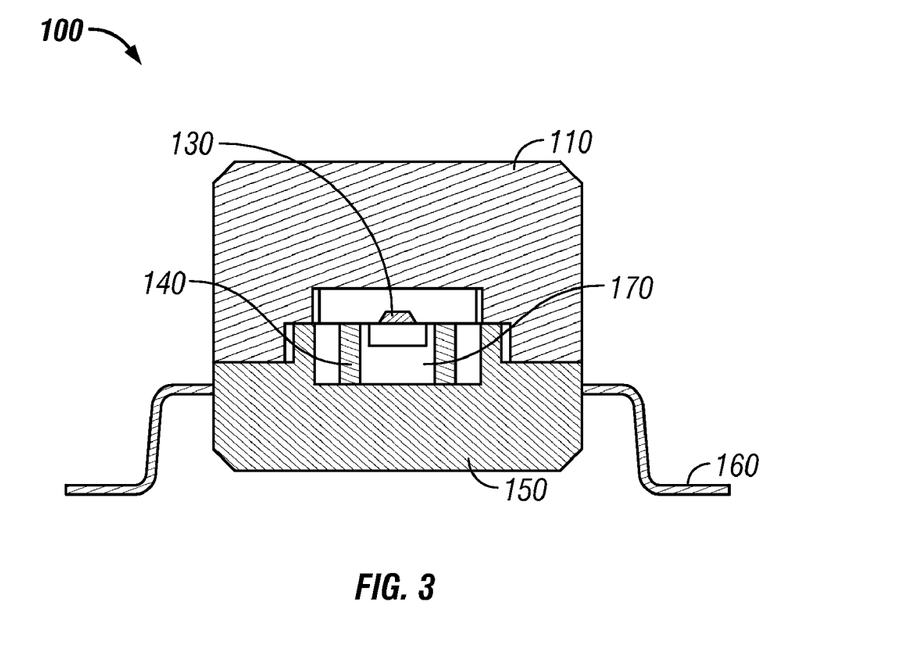
FIG. 3 illustrates a front sectional view of the thermal anemometer flow sensor apparatus depicted in FIG. 1, in accordance with a preferred embodiment.

FIG. 3 illustrates a front sectional view of the thermal anemometer flow sensor apparatus 100, in accordance with a preferred embodiment. In general, the flow sensor apparatus 100 can be utilized to sense and measure mass flow rate of a gas within the medium. The flow sense element 130 can be made of thin silicon materials in order to have a small thermal mass and be able to sense very small flow rates. The output of the flow sense element 130 can be transferred to the ASIC chip 190 to convert the sensed flow into a proportional analog output signal. The seal 140 with a conductive interconnect eliminates the need for wirebonds from the flow sense element 130 to the ASIC chip 190. The ASIC chip 190 provides a high order calibration and signal processing of flow signals from the sensor apparatus 100 to a processed signal output representative of the flow. The processed signal output can be stored in the memory module.

Figure 4:
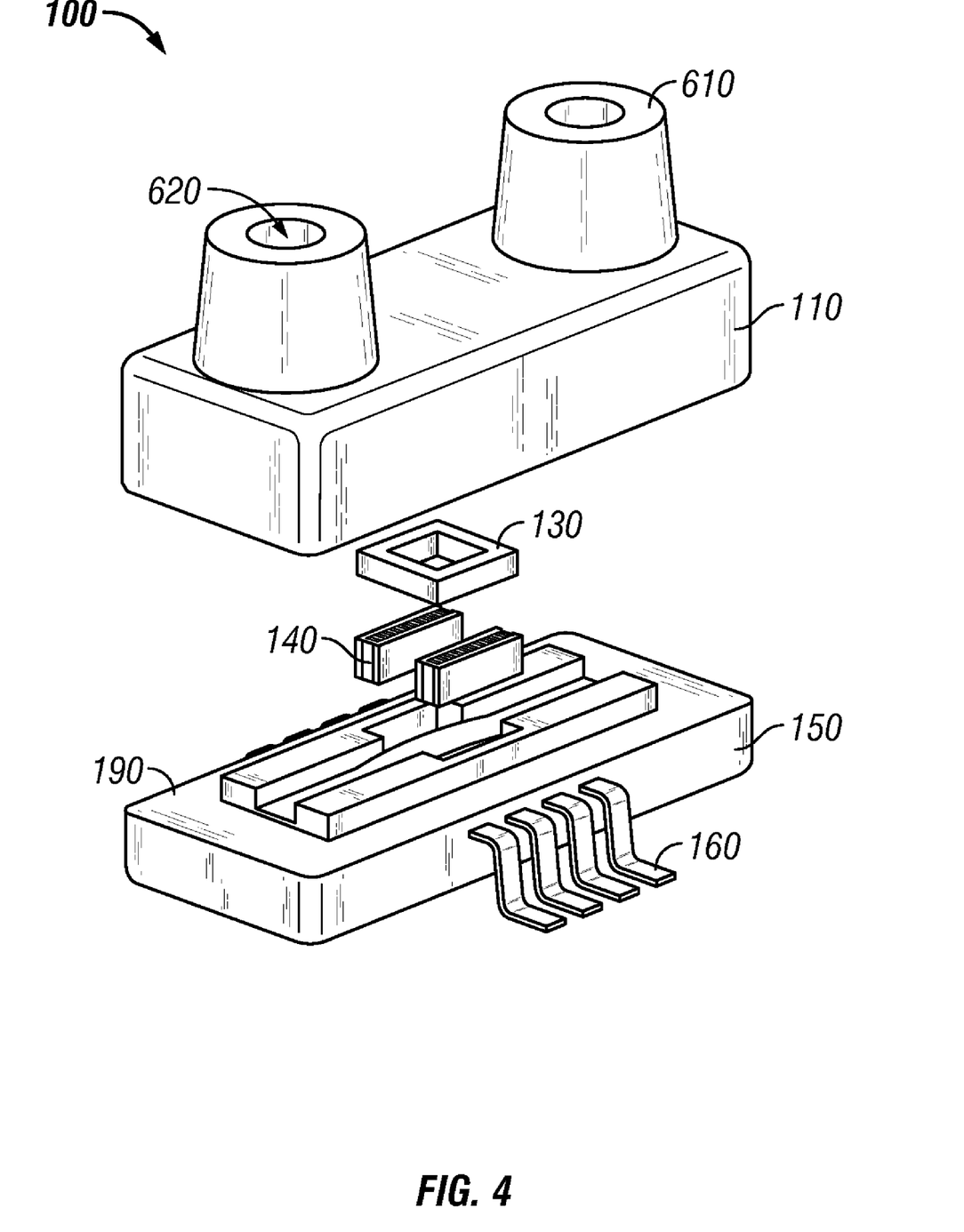
FIG. 4 illustrates a perspective view of a thermal anemometer flow sensor apparatus associated with a U-shaped flow tube, in accordance with a preferred embodiment.

FIG. 4 illustrates a perspective view of the thermal anemometer flow sensor 100 associated with a U-shaped flow tube 610, in accordance with a preferred embodiment. As depicted in FIG. 4, the flow sensor apparatus 100 can be configured to include the U-shaped flow tube 610 through which the media is capable of travelling. The U-shaped flow tube 610 is associated with molded ports that can be added to one side of the pressure sense element 130. The U-shaped flow tube 610 can be preferably configured from a metal or thermoplastic material. Note that the U-shaped flow tube 610, however, can be of varying size, that is of smaller or larger cross-sectional size at certain locations to alter the flow rate range capability accordingly. Note that in this particular embodiment, the electrical connection can be provided by two separate prices of z-axis conductive material.

The U-shaped flow tube 610 can be terminated with the inlet ports for affixing the flow sensor apparatus 100 into an existing flow system. The difference between pressures in the U-shaped flow tube 610 can be measured by passing the media through the flow sense element 130 in order to calculate the pressure in the media. It will be recognized by those skilled in the art that various configurations and positioning of the ports may be included in the package to yield various configurations and various pressure measurements.

Figure 5:
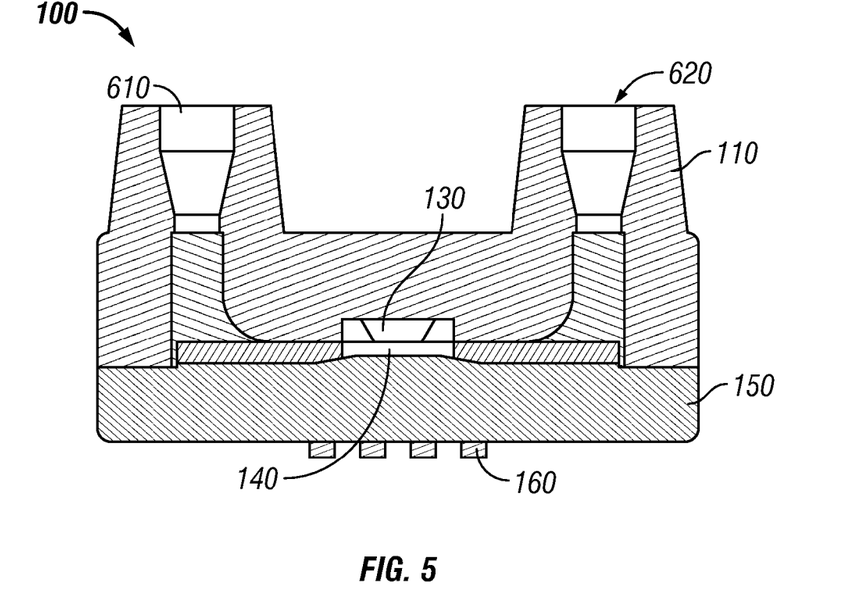
FIG. 5 illustrates a side sectional view of the thermal anemometer flow sensor apparatus depicted in FIG. 4, in accordance with a preferred embodiment.

FIG. 5 illustrates a side sectional view of the thermal anemometer flow sensor 100 associated with the U-shaped flow tube 610, in accordance with a preferred embodiment. Again as reminder, note that in FIGS. 1-7 identical, similar parts or elements are generally indicated by identical reference numerals. Thus, as illustrated in FIG. 5, the pressure in the U-shaped flow tube 610 can be sensed by the flow sense element 130, which is preferably packaged with the seal 140 with a conductive interconnect. The seal 140 can be composed of an elastomeric material, which is impervious to the media into which the sensor apparatus 100 is to be operated. It is understood that seal 140 hardness and compression can be selected to provide an effective seal to the flow sense element 130 for intended use in various environments over a broad range of temperatures and pressures.

Figure 6:
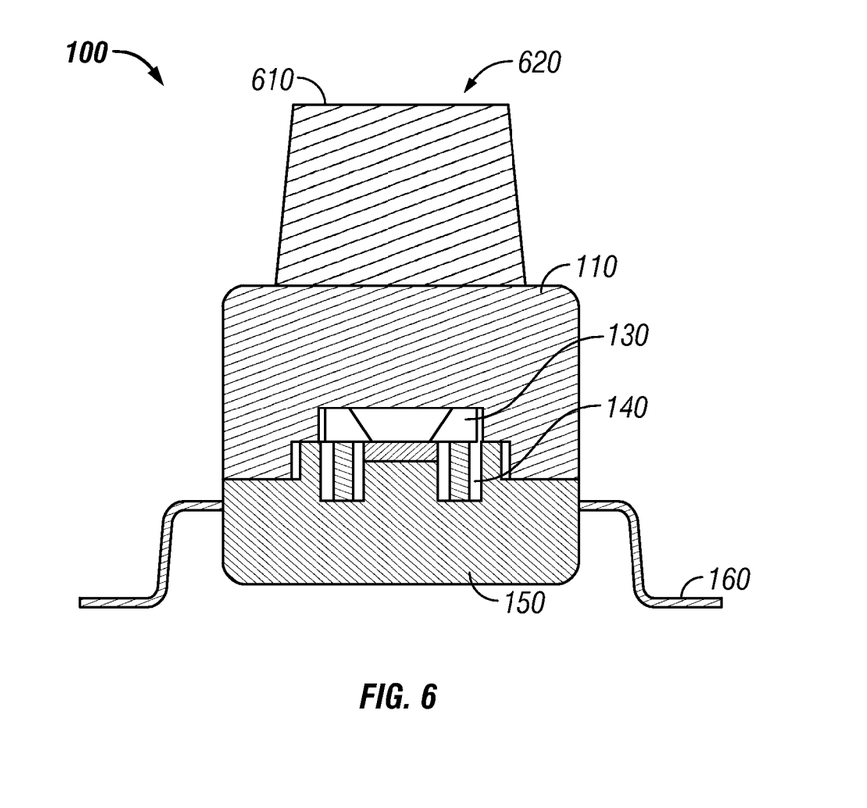
FIG. 6 illustrates a front sectional view of the thermal anemometer flow sensor apparatus depicted in FIG. 4, in accordance with a preferred embodiment.

FIG. 6 illustrates a front sectional view of the thermal anemometer flow sensor apparatus 100 with the U-shaped flow tube 610, in accordance with a preferred embodiment. Thus, the sensor apparatus 100 disclosed herein can be utilized in a flow system (not shown) for measuring a flow rate of the air or gas. Note that the embodiments discussed herein generally relate to a mass flow sensing system or apparatus. It can be appreciated, however, that such embodiments can be implemented in the context of other sensing systems and designs and are not limited to flow sensing technique. The discussion of mass flow sensing systems as presented herein is presented for general illustrative purposes only. The apparatus 100 includes the flow sense element 130 for sensing mass flow within the U-shaped flow tube 610. The elements of the flow sense element 130 can be typically connected in a Wheatstone bridge circuit to convert the sensed mass flow into a corresponding voltage. The flow sense element 130 can also be utilized to measure an unknown electrical resistance by balancing bridge circuit.

The output of the mass flow sense element 130 can be transferred to the signal conditioning ASIC chip 190. The ASIC chip 190 can also store calibration data and sensor related information. It can be appreciated that other types of ASIC devices may also be utilized to implement signal-conditioning ASIC chip 190, depending upon design considerations. Such thermal anemometer flow sensor apparatus 100 can improve the accuracy of the sensing output signal.

Figure 7:
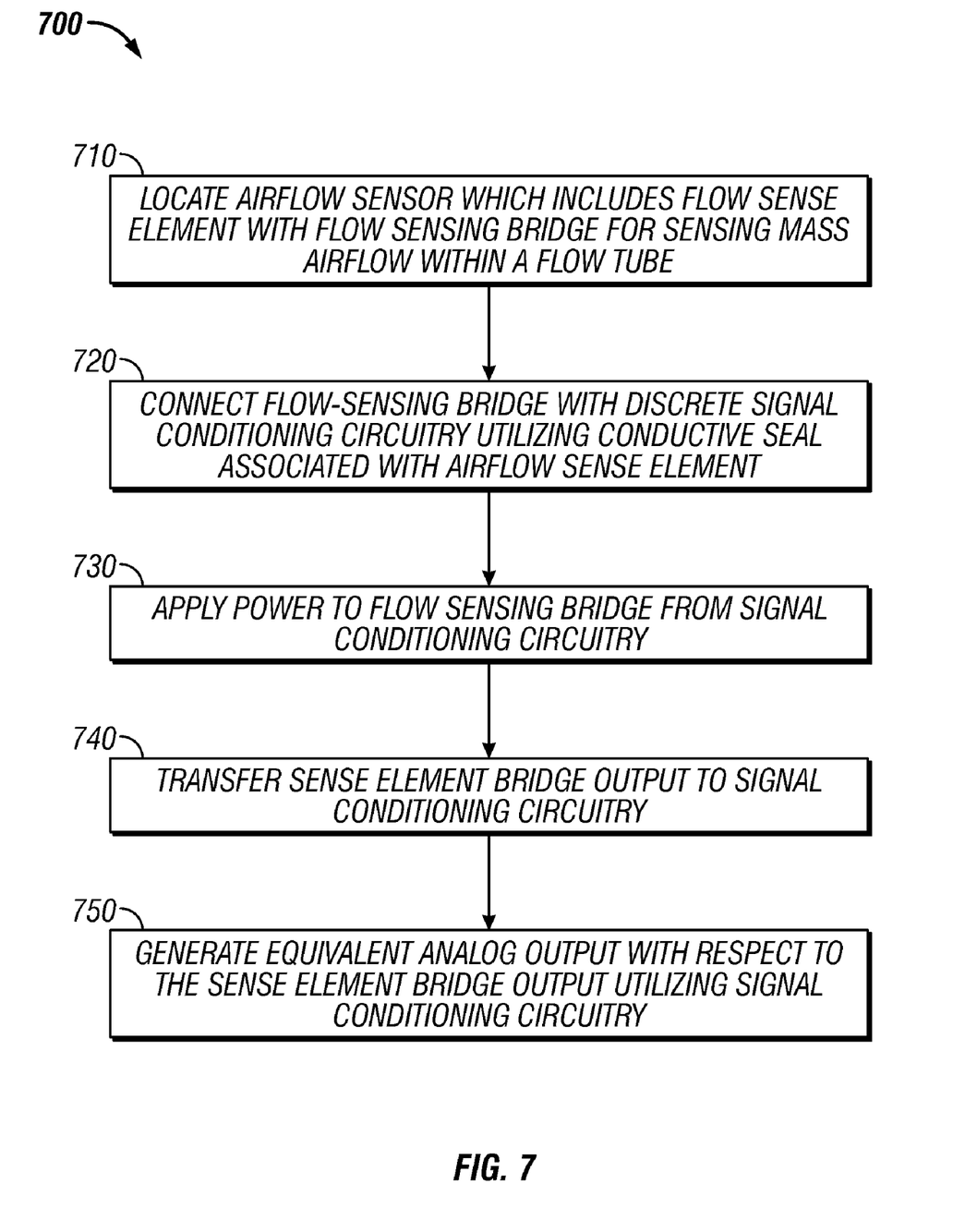
FIG. 7 illustrates a flow chart of operation illustrating logical operational steps of a method for sensing mass flow utilizing the thermal anemometer flow sensor apparatus with a seal with a conductive interconnect, which can be implemented in accordance with an alternative embodiment.

FIG. 7 illustrates a flow chart of operation illustrating logical operational steps of a method 700 for sensing mass flow utilizing the thermal anemometer flow sensor apparatus 100 with the seal 140, which can be implemented in accordance with an alternative embodiment. As indicated at block 710 in FIG. 7, the flow sensor apparatus 100 that includes the mass flow sense element 130 for sensing mass flow can be mounted within the flow tube 170 or 610. The mass flow sensor apparatus 100 can be utilized to measure and sense mass flow rate of, for example, a gas. Thereafter, as depicted at block 720 of FIG. 7, the flow sense element 130 of the flow sensor apparatus 100 can be electrically connected with a signal conditioning circuitry which can be an ASIC chip 190 utilizing the seal 140 associated with the air flow sense element 130.

The ASIC chip 190 can be utilized to read the output of the flow sense element 130 and further convert the output signal into an equivalent analog signal. Power can be applied to the flow sense element 130 of the flow sensor apparatus 100 from the ASIC chip 190, as illustrated at block 730. The output of the flow sense element 130 can be transferred to the ASIC chip 190, as described at block 740. The ASIC chip 190 generates an analog signal with respect to the output of the flow sense element 130, as depicted at block 750. Such a mass flow sensor design can enable mass flow sensing over wide ranges at a reasonable cost and provide trouble free operation in heretofore-hostile environments.

The apparatus 100 can be readily adapted to a variety of ranges of operation, has a comparatively low cost of construction, is readily assembled, presents a low risk of damage to the electronics during assembly or operation, is accurate and reliable in operation, and is more readily cleaned than known prior art. When utilized in the preferred flow-through embodiment illustrated and described herein above, the present invention also establishes flow with minimal turbulence and interference and thereby provides repeatable and accurate output readings.

The flow sensor apparatus 100 eliminates the need for wirebonds from the sense element 130 on thick film or thin film to the ASIC chip 190, which reduces overall footprint of the sensor. The flow tubes 170 or 610 can be utilized to route non turbulent flow across the sense element 130 of the thermal anemometer 100. Such a flow sensor apparatus 100 is smaller, lower in cost, more robust and easier to assemble utilizing seal 140, thereby eliminating the need for bonding wires.

The disclosed embodiments thus are capable of providing a number of advantages, including the major benefit that is gained from the use of the seal with a conductive interconnect, which isolates the wirebond pads and electrical connections from the sensed media. The media, whether liquid or gas, can contain ionics that eventually contaminates the top of the mass flow sense element. This situation will not occur if the seal has sealed off these electrical connections and prevent exposure with the sensed media as indicated by the embodiments disclosed herein.

Various alterations and modifications will occur to those skilled in the art from the foregoing detailed description and the accompanying drawings. It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A flow sensor apparatus, said apparatus comprising:
   a flow sense element including a flow sensing bridge, wherein said flow sense element and said flow sensing bridge are mounted on a housing and together sense a mass flow of a flow path; and
   a seal with a conductive interconnect, wherein said seal is positioned adjacent said flow sensing bridge such that said seal with said conductive interconnect physically isolates said flow sensing bridge physically from an external environment;
   a signal conditioning circuit that converts a sensed flow into a proportional analog output signal, wherein said signal conditioning circuit is electrically connected to said flow sensing bridge; and
   wherein said seal with said conductive interconnect conducts a power signal along at least part of a path from said signal conditioning circuit to said flow sensing bridge, and conducts an output signal along at least part of a path from said flow sensing bridge to said signal conditioning circuit.

2. The apparatus of claim 1 further comprising:
   a cover comprising an inlet port and an outlet port with the flow path extending between the inlet port and the outlet port, wherein said cover is positioned over said flow sense element and mounted on said housing.

3. The apparatus of claim 1 further comprising:
   a lead frame comprising a plurality of electrical connectors, wherein said lead frame forms at least part of the path between said flow sense element and said signal conditioning circuit.

4. The apparatus of claim 1 wherein said flow sensing bridge is arranged in a context of a Wheatstone bridge circuit that converts said sensed flow into a corresponding voltage.

5. The apparatus of claim 1 wherein said seal with said conductive interconnect allows said flow sense element to be mounted in an inverted down position in order to prevent moisture ingress and dust particle build up within said flow sensor apparatus.

6. The apparatus of claim 1 wherein said cover routes a non-turbulent flow across said flow sense element.

7. The apparatus of claim 1 wherein said flow sensing bridge comprises a thick film network.

8. The apparatus of claim 1 wherein said flow sensing bridge comprises a thin film network.

9. A flow sensor apparatus, said apparatus comprising:
   a flow sense element including a flow sensing bridge, wherein said flow sense element and said flow sensing bridge are mounted on a housing and sense a mass flow of a flow path;
   a cover comprising an inlet port and an outlet port with the flow path extending between the inlet port and the outlet port, said cover is mounted over said flow sense element and on said housing; and
   a seal with a conductive interconnect positioned adjacent said flow sensing bridge, wherein said seal with said conductive interconnect physically isolates said flow sensing bridge from an external environment, and said seal with said conductive interconnect is configured to transmit a power signal to said flow sensing bridge and to further transmit an output signal from said flow sensing bridge.

10. The apparatus of claim 9 further comprising:
    a discrete signal conditioning circuit that converts a sensed flow into a proportional analog output signal, wherein said discrete signal conditioning circuit is in electrical communication with said flow sensing bridge via, at least in part, the seal with said conductive interconnects.

11. The apparatus of claim 9 further comprising:
    a lead frame comprising a plurality of electrical connectors, wherein said lead frame forms at least part of an electrical connection between said flow sense element and a signal conditioning circuit.

12. A method of configuring a flow sensor apparatus, said method comprising:
    providing a flow sense element having a flow sensing bridge;
    mounting said flow sense element and said flow sensing bridge on a housing, wherein said flow sense element and said flow sensing bridge are configured to sense a mass flow within a flow path; and
    positioning a seal with a conductive interconnect adjacent said flow sensing bridge, wherein said seal with said conductive interconnect isolates said flow sensing bridge from an external environment;
    providing a signal conditioning circuit that is configured to convert a sensed flow into a proportional analog output signal;
    electrically connecting said flow sensing bridge circuit to said signal conditioning circuit; and
    configuring said seal with said conductive interconnect to conduct a power signal along at least part of a path from said signal conditioning circuit to said flow sensing bridge, and conduct an output signal along at least part of a path from said flow sensing bridge to said signal conditioning circuit.

13. The method of claim 12 further comprising:
    providing a cover with
    an inlet port and an outlet port with the flow path extending between the inlet port and the outlet port.

14. The method of claim 12 further comprising:
    providing a lead frame that includes a plurality of electrical connectors, wherein said lead frame forms at least part of an electrical connection between said flow sense element and said signal conditioning circuit.

15. The method of claim 12 further comprising arranging said flow sensing bridge in a context of a Wheatstone bridge circuit that converts said sensed flow into a corresponding voltage.

16. The method of claim 12 further comprising configuring said seal with said conductive interconnect to allow said flow sense element to be mounted in an inverted down position in order to prevent moisture ingress and dust particle build up within said flow sensor apparatus.

17. The apparatus of claim 1, wherein wire bond connections do not form any part of an electrical connection between the flow sense element and the signal conditioning circuit.

18. The apparatus of claim 1, wherein the flow sense element is a thermal anemometer type flow sensor element.

19. The apparatus of claim 1, wherein the seal includes an elastomeric material.

* * * * *